(12) United States Patent
Abedini et al.

(10) Patent No.: US 12,732,893 B2
(45) Date of Patent: Sep. 8, 2026

(54) SYNCHRONIZATION SIGNAL BLOCK (SSB) MODIFICATION

(71) Applicant: QUALCOMM Incorporated, San Diego, CA (US)

(72) Inventors: Navid Abedini, Basking Ridge, NJ (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/544,865

(22) Filed: Dec. 19, 2023

(65) Prior Publication Data

US 2025/0203490 A1 Jun. 19, 2025

(51) Int. Cl.
*H04W 48/08* (2009.01)
*H04W 72/1273* (2023.01)
*H04W 72/232* (2023.01)

(52) U.S. Cl.
CPC ....... *H04W 48/08* (2013.01); *H04W 72/1273* (2013.01); *H04W 72/232* (2023.01)

(58) Field of Classification Search
CPC ............. H04W 48/08; H04W 72/1273; H04W 72/232
See application file for complete search history.

(56) References Cited

U.S. PATENT DOCUMENTS 11,683,721 B2 * 6/2023 Paczkowski .......... H04W 28/06 370/230
11,924,785 B2 * 3/2024 Sun ...................... H04W 16/28
11,962,374 B2 * 4/2024 Raghavan ............. H04L 5/0053
11,997,535 B2 * 5/2024 Paczkowski .......... H04W 24/02
12,047,889 B2 * 7/2024 Ji .......................... H04B 7/088
12,200,696 B2 * 1/2025 Pezeshki ............. H04W 36/362
12,348,982 B2 * 7/2025 Chande ............... H04W 56/001
2020/0245157 A1 * 7/2020 Chande ............... H04B 7/0695
2021/0212091 A1 * 7/2021 Pezeshki .............. H04W 72/54
2021/0289455 A1 * 9/2021 Sun ..................... H04W 56/001
2022/0201638 A1 * 6/2022 Arrobo Vidal ........ H04W 48/08
2022/0377799 A1 * 11/2022 MolavianJazi ... H04W 74/0833
(Continued)

FOREIGN PATENT DOCUMENTS

WO 2021183953 A1 9/2021
WO WO-2023141915 A1 * 8/2023 ........ H04W 74/0833
(Continued)

OTHER PUBLICATIONS

International Search Report and Written Opinion—PCT/US2024/056388—ISA/EPO—Mar. 21, 2025.
(Continued)

*Primary Examiner* — Hai V Nguyen
(74) *Attorney, Agent, or Firm* — Patterson + Sheridan, L.L.P.

(57) ABSTRACT

One aspect provides a method for wireless communication. The method includes obtaining a first indication of a first set of beam configurations associated with a plurality of synchronization signal blocks (SSBs); obtaining a second indication of a second set of beam configurations associated with one or more of the plurality of SSBs that are reconfigured; and obtaining at least one of the plurality of SSBs in accordance with the second indication.

30 Claims, 12 Drawing Sheets

(56) References Cited

U.S. PATENT DOCUMENTS

| | | | | |
|---|---|---|---|---|
| 2023/0276260 | A1* | 8/2023 | Abedini | H04W 68/005 370/254 |
| 2023/0363006 | A1* | 11/2023 | Huang | H04W 48/08 |
| 2023/0389013 | A1* | 11/2023 | Pezeshki | H04W 72/1268 |
| 2024/0188097 | A1* | 6/2024 | Wang | H04L 5/0023 |
| 2024/0251331 | A1* | 7/2024 | Ding | H04W 48/12 |
| 2025/0024511 | A1* | 1/2025 | Li | H04B 17/328 |
| 2025/0039809 | A1* | 1/2025 | Jiang | H04W 74/00 |
| 2025/0055655 | A1* | 2/2025 | Krishnan | H04B 7/0617 |
| 2025/0351153 | A1* | 11/2025 | Go | H04B 7/06968 |

FOREIGN PATENT DOCUMENTS

| | | | | |
|---|---|---|---|---|
| WO | WO-2023193802 A1 * | 10/2023 | H04W 74/0891 |
| WO | 2025038223 | 2/2025 | |
| WO | WO-2025038223 A1 * | 2/2025 | H04B 7/088 |

OTHER PUBLICATIONS

Moderator (Intel Corporation): “Discussion Summary for Energy Saving Techniques of NW Energy Saving SI”, 3GPP TSG RAN WG1 Meeting #110, R1-2207697, 3rd Generation Partnership Project, Mobile Competence Centre, 650, Route Des Lucioles, F-06921, Sophia-Antipolis Cedex, France, vol. RAN WG1, No. Toulouse, France, Aug. 22, 2022-Aug. 26, 2022, Aug. 28, 2022, 34 Pages, XP052275628, pp. 5-6 Observations from Lenovo pp. 11-12 Observations from Qualcomm.

* cited by examiner

400
One Frame (TDD)
10 ms
subframe
slot
RB
D D D D D D D D D D D D X U
OFDM symbol
subcarrier
DMRS Rx
CSI-RS 430
20 RBs
system bandwidth
SS/PBCH Block
PDCCH
SSS
PSS
PDSCH
PBCH 450
D X U U U U U U U U U U U U
SRS
SRS Comb 0
SRS Comb 1
DMRS R 480
RBs
PUCCH
PUSCH

SYNCHRONIZATION SIGNAL BLOCK (SSB) MODIFICATION

BACKGROUND

Field of the Disclosure

Aspects of the present disclosure relate to wireless communications, and more particularly, to techniques for performing a synchronization signal block (SSB) update.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication. The method includes obtaining a first indication of a first set of beam configurations associated with a plurality of synchronization signal blocks (SSBs); obtaining a second indication of a second set of beam configurations associated with one or more of the plurality of SSBs that are reconfigured; and obtaining at least one of the plurality of SSBs in accordance with the second indication.

Another aspect provides a method for wireless communication. The method includes outputting an indication of a first set of beam configurations associated with a plurality of synchronization signal blocks (SSBs); outputting a second indication indicating a second set of beam configurations associated with one or more of the plurality of SSBs that are reconfigured; and outputting at least one of the plurality of SSBs in accordance with the second indication.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for synchronization signal block (SSB) modification. For example, in some aspects, a BS may update SSB configuration (e.g., including changing of associated beams, activation, or deactivation). In some aspects, a BS may indicate the updated SSB configuration to UEs to assist UEs in various operations such as rate matching, SSB monitoring, or beam prediction. In some aspects, the BS may also indicate the original SSB configuration (e.g., without the update) to be used for random access channel (RACH) (or paging) occasion mapping. Thus, aspects of the present disclosure allow for SSB modification and indication to assist UE operations, while maintaining compatibility with legacy UEs that expect to receive a certain SSB configuration (e.g., the original SSB configuration without the update). As used herein, a wireless node (e.g., or wireless device) may refer to a UE or a network entity.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
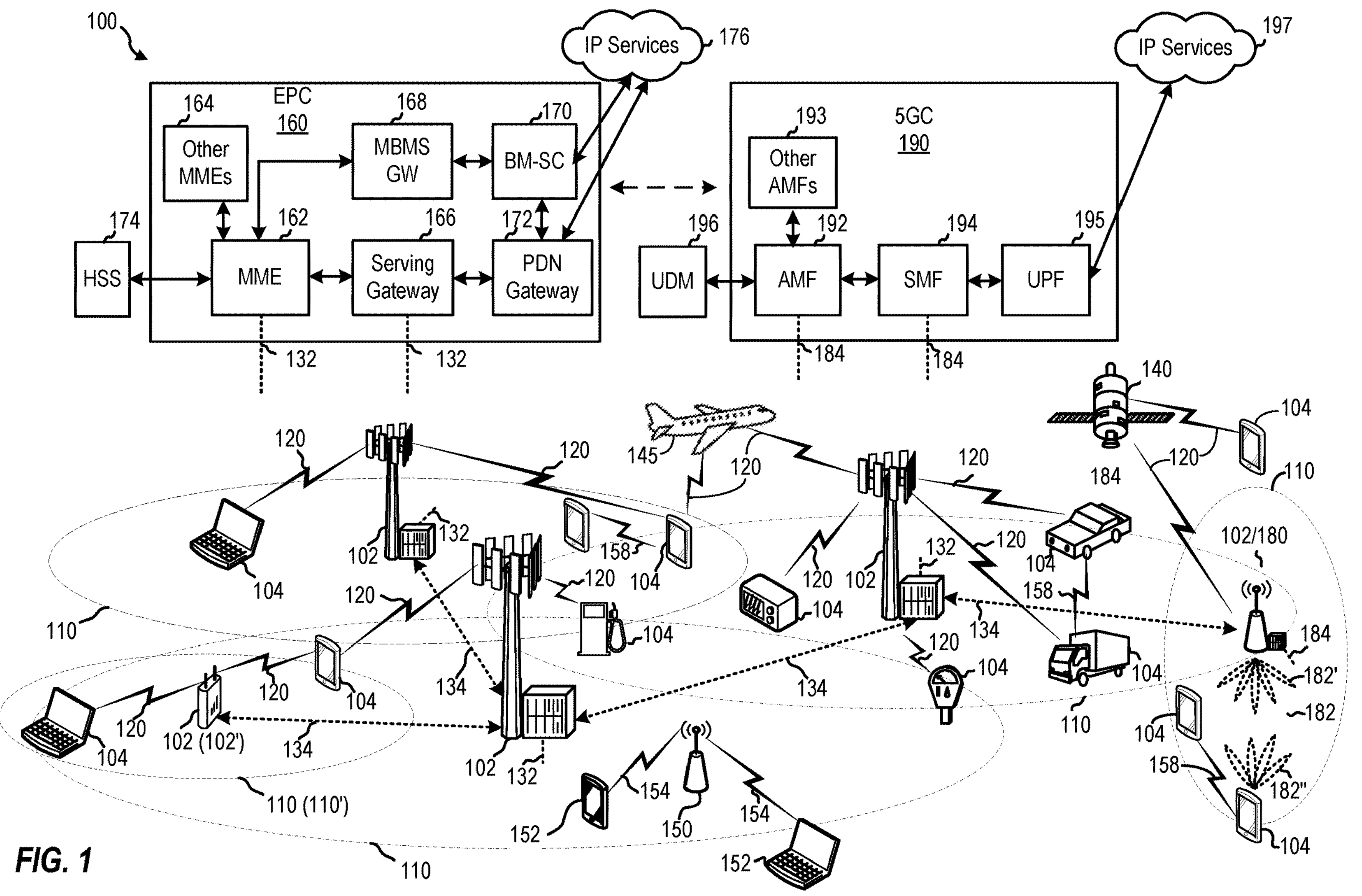
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
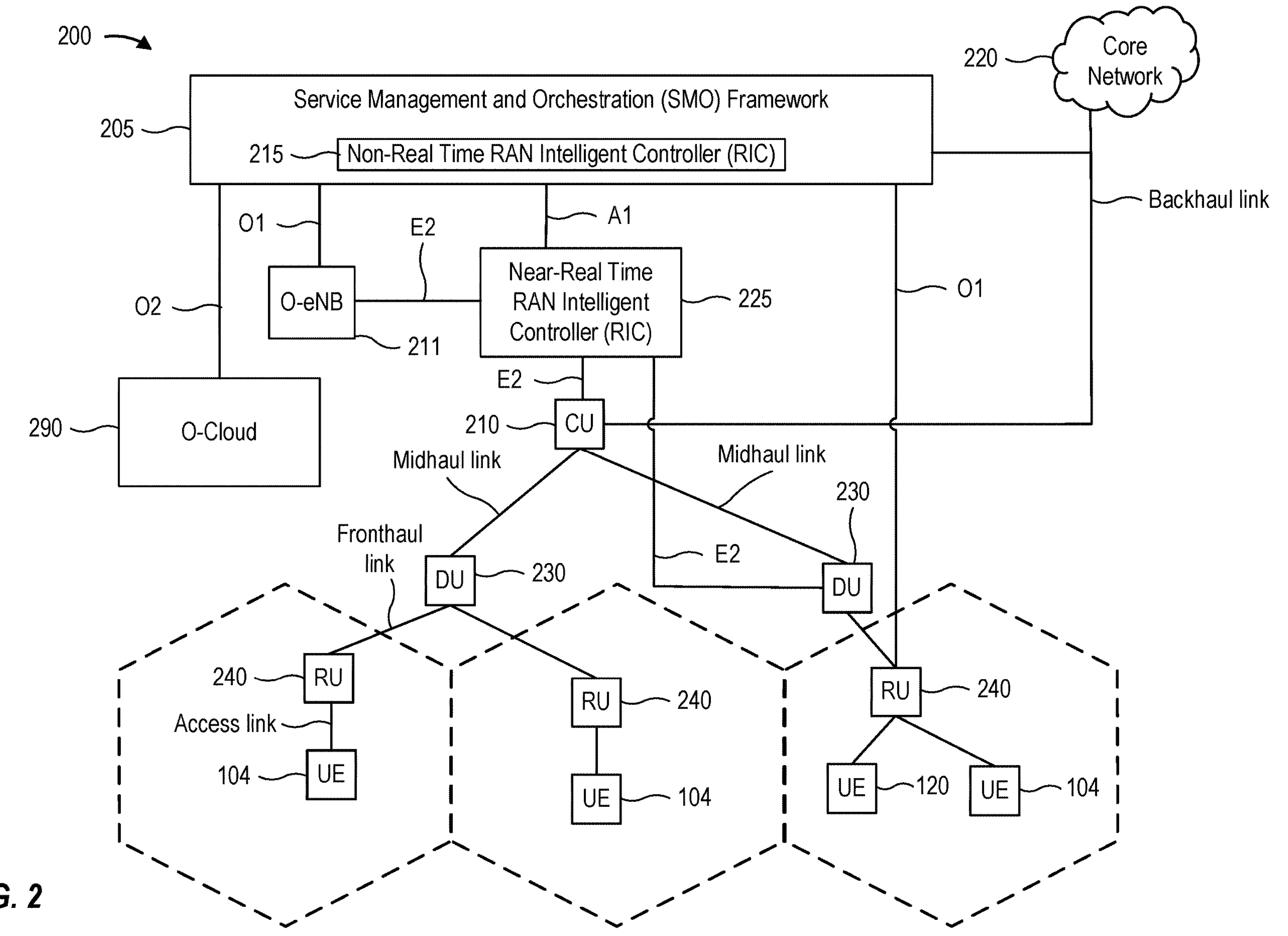
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-52,600 MHZ, which is sometimes referred to (interchangeably) as a “millimeter wave” (“mmW” or “mmWave”). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as AI policies).

Figure 3:
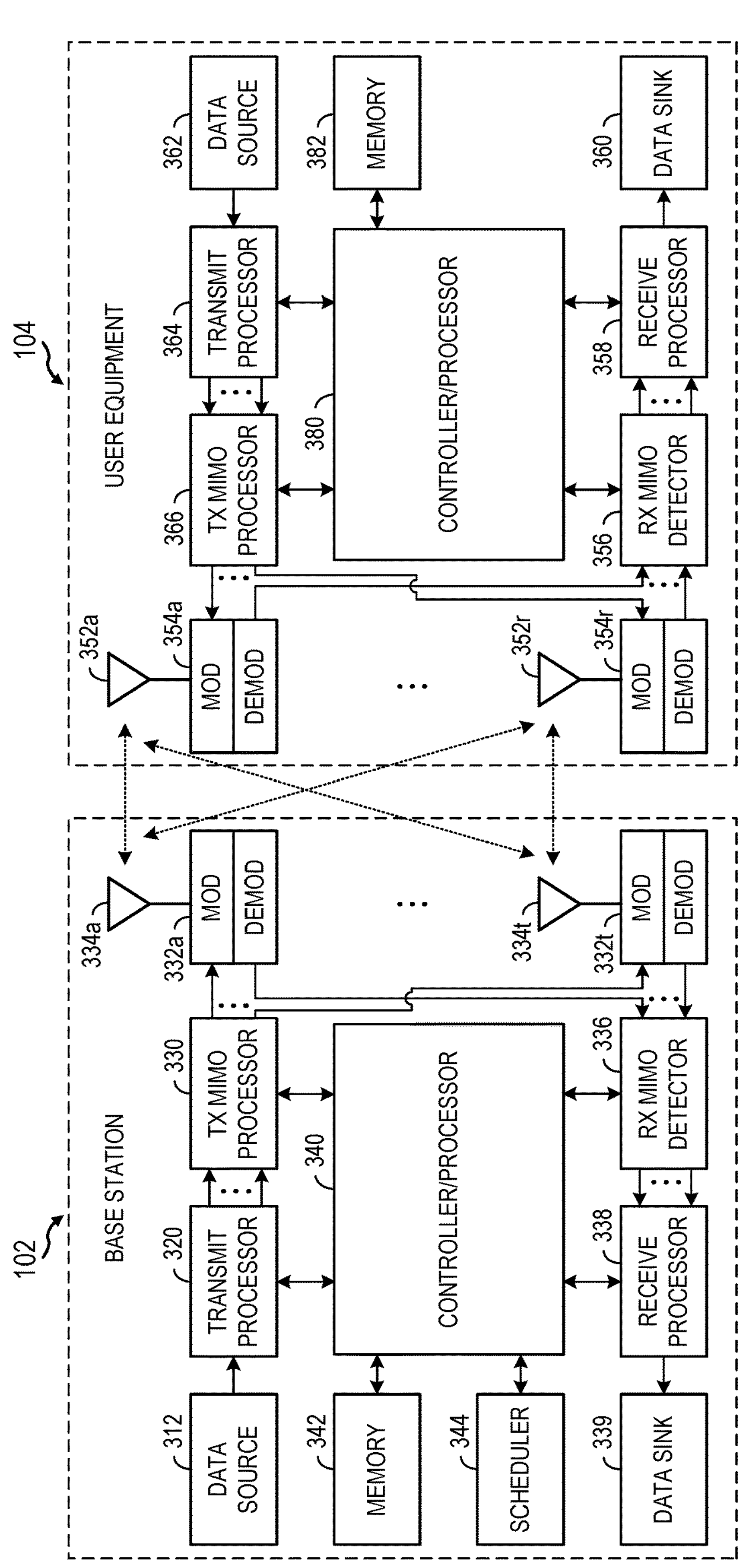
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
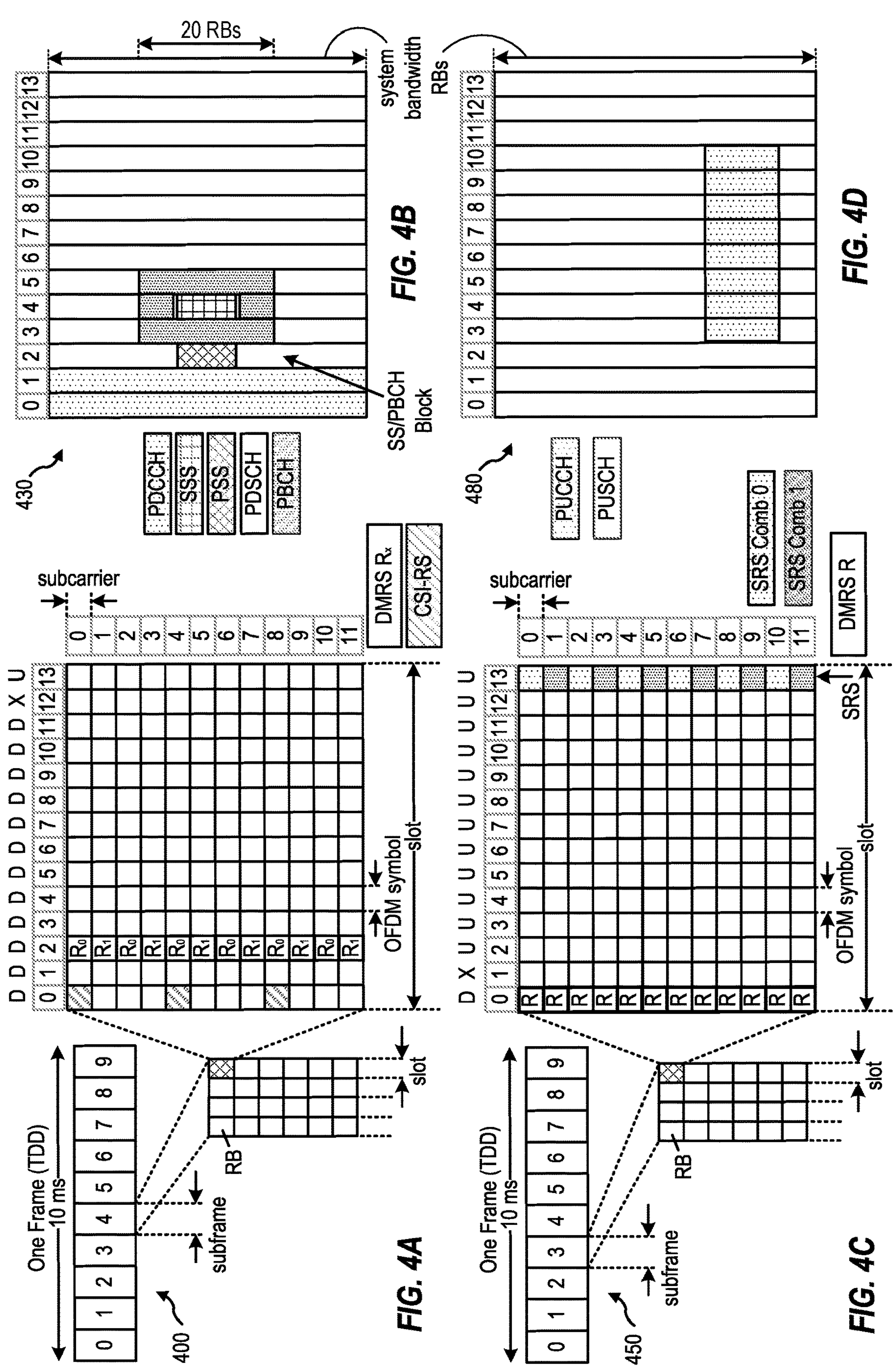
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to SSB Modification

In some cases, a cell may use a set of fixed physical beams for sending synchronization signal blocks (SSBs) and the set of active SSBs may not be changed (e.g., or may be changed occasionally). In legacy implementations, what physical beams are used to send SSBs for a cell may be transparent to UEs. The UE may assume an SSB is always associated with the same physical beam, and through measurements, the UE learns/tracks such a beam. An SSB index may be used as a proxy to refer to a physical beam. In legacy implementations, there may be signaling to indicate the set of active SSBs (e.g., out of all the SSB candidate locations within a SSB burst set). For example, a field referred to as "SSB Positions In Burst" in remaining minimum system information (RMSI) may be used to indicate active SSBs. The active SSBs may also be indicated in a dedicated radio resource control (RRC) signal. For example, if some SSBs are deactivated or some SSBs are activated for a cell, a system informant block (e.g., SIB1) or dedicated RRC may be updated and an indication may be provided to the UEs of the deactivated SSBs.

There are now more scenarios where the set of active SSBs or the beams used for sending the SSBs may change more frequently (e.g., for network (NW) energy savings and where beam/SSB (de)activation is supported including on-demand/triggered SSBs). Certain aspects of the present disclosure are directed toward techniques for efficiently notifying UEs about SSB (de/re) activation and/or remapping.

Figures 5A, 5B, 5C, 5D:
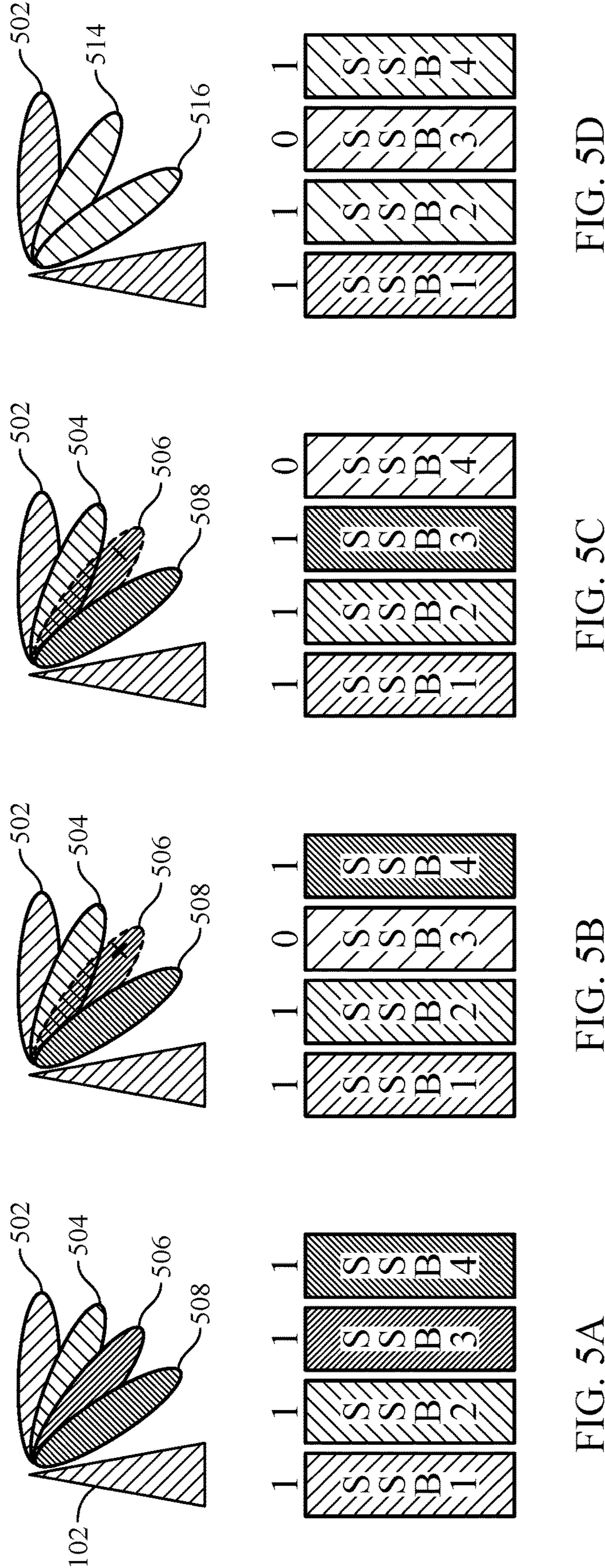
FIGS. 5A, 5B, 5C, and 5D illustrates example modifications of synchronization signal block (SSB) configurations.

FIGS. 5A, 5B, 5C, and 5D illustrates modifications of SSB configurations. As shown in FIG. 5A, at a first time, a first SSB (e.g., referred to as "SSB1") may be transmitted using beam 502, a second SSB (e.g., referred to as "SSB2") may be transmitted using beam 504, a third SSB (e.g., referred to as "SSB3") may be transmitted using beam 506, and a fourth SSB (e.g., referred to as "SSB4") may be transmitted using beam 508.

As shown in FIG. 5B, at a second time, an SSB (e.g., SSB3 on beam 506) may be deactivated. In some aspects, the deactivation may be indicated to UEs using an updated SSB bitmap.

As shown in FIG. 5C, the SSBs may be rearranged at a third time. For example, SSB3 may be sent using beam 508 (e.g., as opposed to beam 506) and SSB4 may be deactivated. Certain aspects of the present disclosure are directed to techniques for indicating that an SSB (e.g., SSB3) uses the same physical beam as the beam previously used by another SSB (e.g., SSB4), allowing the UE to monitor the physical beam for the new SSB (SSB3).

In some cases, a different codebook may be used for SSBs as shown in FIG. 4. For example, SSB1, SSB2, and SSB4 may be transmitted using beams 512, 514, 516 (where SSB3 is deactivated). Certain aspects are directed to techniques for signaling the change of the physical beams, as described in more detail herein.

Figure 6:
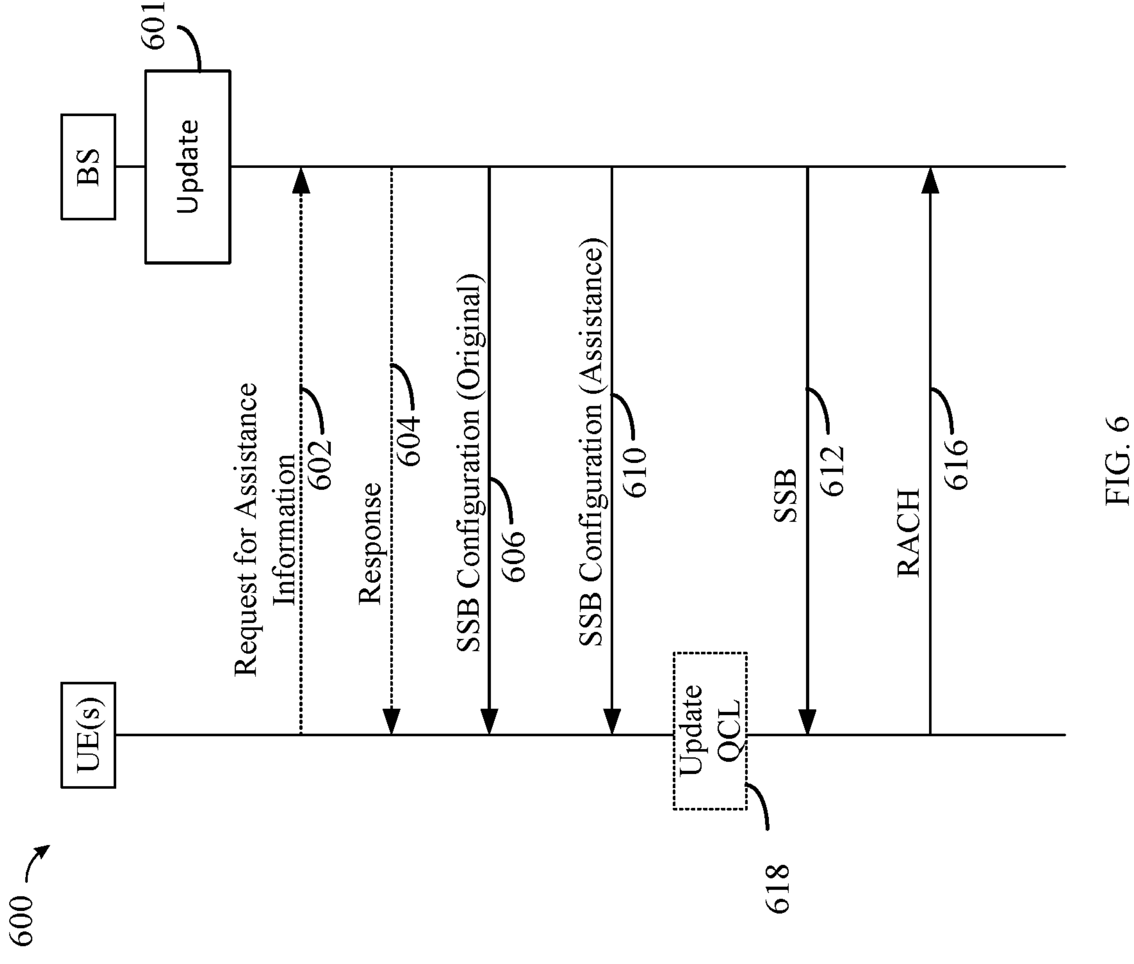
FIG. 6 is a timing diagram illustrating example signaling to support an SSB configuration change, in accordance with certain aspects of the present disclosure.

FIG. 6 is a timing diagram 600 illustrating example signaling to support an SSB configuration change, in accordance with certain aspects of the present disclosure. Certain aspects are directed towards SSB activation or deactivation. SSB activation or deactivation may be indicated to the UEs via an updated SSB bitmap (e.g., "SSB Positions In Burst" in a system information block (e.g., SIB1)). For example, at block 601, the BS may identify an update to the SSB configuration, as described herein. The SSB may send an updated SSB configuration 610 (e.g., SSB bitmap), which may be sent as part of system information (SI) and/or a dedicated RRC. In some aspects, the configuration 610 may be used as assistance information, as described in more detail herein.

In some aspects, if changing a bit value in the bitmap (e.g., indicating configuration 610) from 0 to 1 (e.g., indicating that an SSB is activated), an updated bitmap may be indicated to UEs as described. Otherwise, the UEs may ignore the newly added SSB. In some aspects, if changing a bit value of the bitmap from 1 to 0 (e.g., indicating an SSB is not deactivated), an updated bitmap may be indicated in some aspects, or may not be indicated in other aspects. For example, if an updated bitmap is not indicated, the UE may assume that some SSBs are present, while they are not in reality (e.g., assuming the deactivated SSBs are not essential for the UE's connectivity). Without indicating the updated bitmap, the UE may monitor for an SSB that is not transmitted, which should not impact the UE synchronization for communication. Thus, if some SSBs are getting deactivated/activated (e.g., occasionally), the base station may set the associated bit value in the SSB bitmap to 1 and not change it (e.g., leave the associated bit value to 1 regardless of whether the SSB is deactivated). If some new SSB(s) are added to the SSB burst, the base station may update the SSB bitmap (e.g., send configuration 610) to set the associated bit value to 1.

In some aspects, even if an SSB is deactivated, the SSB bitmap may be updated to indicate the deactivation, simplifying the UE's search (e.g., by allowing the UE to skip searching/measuring deactivated SSB locations). Sending the bitmap may also improve resource utilization. For example, if a connected UE knows some SSBs are deactivated, there may be no need for rate matching around the associated resources. In some cases, the UE may be using measurements of such SSBs to run some prediction algorithms (e.g., machine learning (ML)-based algorithms for training and/or inference for beam prediction). Thus, indicating the deactivation of the SSB may aid the UE's prediction. In some aspects, the base station may send the configuration 610 as assistance information to connected UEs about the SSBs that may be occasionally/temporarily activated/deactivated. In other words, the configuration 610 may be sent to assist connected UEs SSB monitoring, rate matching, or running prediction algorithms.

In some aspects, when an SSB change occurs, the updated SSB bitmap information (e.g., configuration 610) may be provided in a dedicated RRC (e.g., for active UEs in RRC). An SSB bitmap may also be sent as part of configuration 606 (e.g., sent as part SI), but the bitmap indicated as part of configuration 606 (e.g., in SI) may remain unchanged (e.g., may not be updated) to avoid sending SI update indication to all UEs including idle/inactive UEs. In other words, the configuration 606 may indicate the original SSB configuration (e.g., prior to update at block 601), where as the configuration 610 used for assistance information for connected UEs may indicate the updated SSB configuration. Thus, the updated SSB bitmap indicated by the dedicated RRC (e.g., as part of configuration 610) may not match the SSB bitmap indicated in SI (e.g., which is used by legacy and idle/inactive UEs). In some aspects, the bitmap indicated in RRC signaling (e.g., configuration 610) may be used by UEs as assistance information (e.g., as needed for simplifying search, improving resource utilization (rate matching), or for prediction algorithms), whereas the bitmap indicated in SI (e.g., configuration 606) may be used for random access channel (RACH) occasion (RO)/paging monitoring occasion (MO) mapping that should be common across all UEs. For example, a UE may receive SSB 612 and transmit a RACH 616 on a RACH occasion associated with the identified SSB. Thus, the mapping between the SSB and the RACH occasion may be identified based on the bitmap indicated in SI (e.g., based on configuration 606). Similarly, a mapping between an SSB and a paging MO may be identified based on the bitmap in the SI (e.g., configuration 606).

In some aspects, signaling may be exchanged between the UE and the BS where the UE may indicate UE capability or send a request 602 for assistance information. The BS may grant the request by sensing a response 604 (e.g., indicating to the UE(s) whether or not the UE can use SSB bitmap in dedicated RRC for rate matching purposes or not). As shown, the BS may send the bitmap (e.g., as assistance information) in a message, which may be an RRC message, media access control (MAC) control element (CE), downlink control information (DCI) in a PDCCH, or any combination thereof. That is, instead of reusing dedicated RRC, a more efficient/dynamic indication may be supported (e.g., support indication via lower-layer signaling such as MAC-CE or DCI or any combination of RRC/MAC-CE/DCI). In some cases, the bitmap for assistance may be indicated using unicast, broadcast, or groupcast (e.g., group-common) indication.

An SSB configuration change may impact ROs and paging physical downlink control channel (PDCCH) MOs. For example, sequential mapping from SSB indices (e.g., indicated by SSB bitmap) to ROs and paging PDCCH MO may be assumed by UEs. For example, SSB1 may map to a first RO, SSB2 may map to a second RO, as so on. Thus, if an SSB is deactivated (e.g., but not indicated to the UE), the associated RO/paging PDCCH MO may be skipped and not used for RACH or paging. In some cases, the BS may use the resources (e.g., previous allocated to the RO or paging MO) for other purposes, reducing any impact on resource utilization. However, the RO or paging MO being skipped may have an impact on latency and power consumption (e.g., on both UE and network (NW) side) associated with RACH and paging (e.g., because otherwise more compact bursts for ROs and paging PDCCH MOs may be implemented). In some aspects, to address this inefficiency, UEs (e.g., including legacy and idle/inactive UEs) may be notified when an SSB is deactivated (e.g., by sending configuration 610). In some aspects, the BS may notify idle/inactive UEs only if the SSB (de)activation is not frequent.

Some aspects allow for a more efficient and simpler indication of updated SSB bitmap to idle/inactive UEs. For example, the BS may indicate the updated bitmap directly (e.g., configuration 610) in PDCCH (e.g., scrambled by paging-radio network temporary identifier (P-RNTI) or a new common RNTI) and/or physical downlink shared channel (PDSCH) scheduled by the PDCCH. For example, the configuration 610 may include an updated bitmap sent in PDCCH or in a PDSCH scheduled by a DCI. In this manner, UEs may not have to reacquire SIB1 to obtain the updated bitmap, saving UE power. In other words, when a UE wakes up to reacquire system information, the updated bitmap may be sent to the UE via PDCCH (e.g., carrying an SI update indication) (or in a PDSCH scheduled by the PDCCH) before the UE goes back to sleep.

Some idle/inactive UEs may also benefit from the knowledge about the deactivated SSBs, simplifying the UE's search/measurement. In some aspects, the BS may indicate list of activated/deactivated SSBs (e.g., via a second bitmap as part of configuration 610) in addition to the original list of candidate SSBs (e.g., in a first bitmap as part of configuration 606).

The first bitmap may be used for MO/RO mapping and the second bitmap may be used for assistance information for the UE (e.g., to be used for search algorithm). The second bitmap may be indicated in SI. In some aspects, a change of SSB bitmap (e.g., SSB configuration) may not trigger an SI update indication (or the change may trigger an SI update indication only to a group of target UEs). In other words, while updated system information may be sent indicating the updated bitmap for the updated SSB configuration, the UE may not be indicated to reacquire the system information (e.g., the UE may, on its own accord, to reacquire system information for the most up to date information).

As described, SSB remapping may occur, including the modification of the mapping between SSBs and physical beam directions. In some aspects, such an SSB remapping may not be indicated to idle/inactive UEs since idle and inactive UEs may perform an exhaustive SSB search every idle mode discontinuous reception (I-DRX) cycle (e.g., unless the UE performs some measurements to refine receive (RX) beam). For connected UEs, the SSB remapping may indicated if impacted SSB (e.g., SSB4) was a quasi co-location (QCL) reference signal (RS) for one of the UE's active transmission configuration indicator (TCI) states. Without any indication from base station regarding the SSB remapping, the remapping may lead to beam failure for the UE. Thus, the base station may update the TCI state(s) for the UEs. For instance, if a TCI state was previously defined based on SSB4, RRC reconfiguration may be used to change the TCI state to be now associated with SSB3.

Figure 7A:
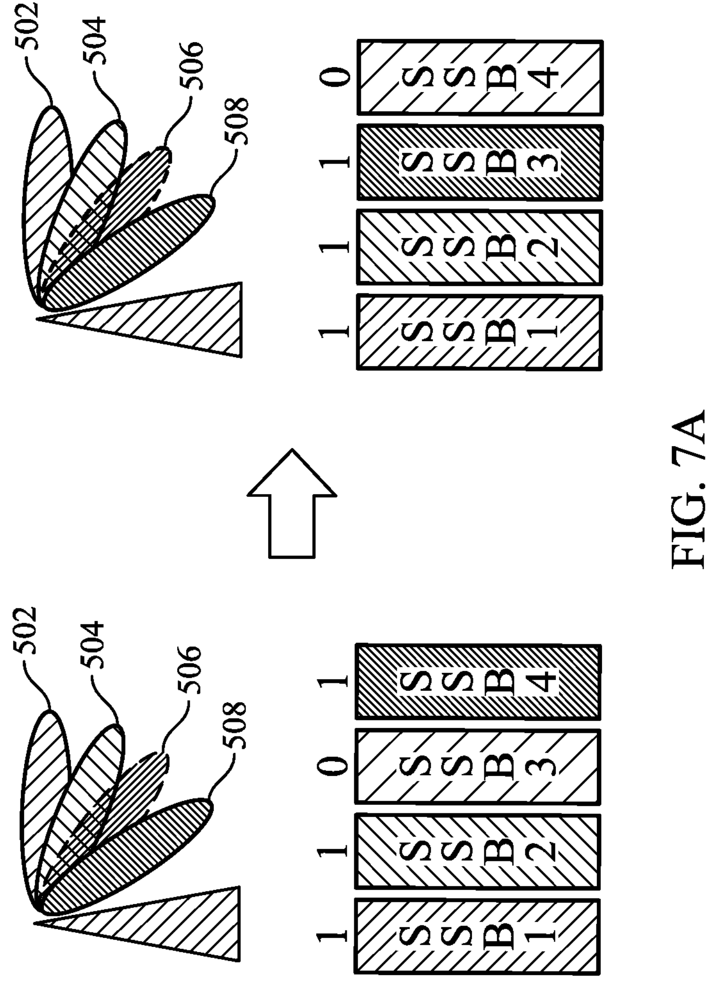
FIGS. 7A and 7B illustrate example SSB remapping scenarios.
Figure 7B:
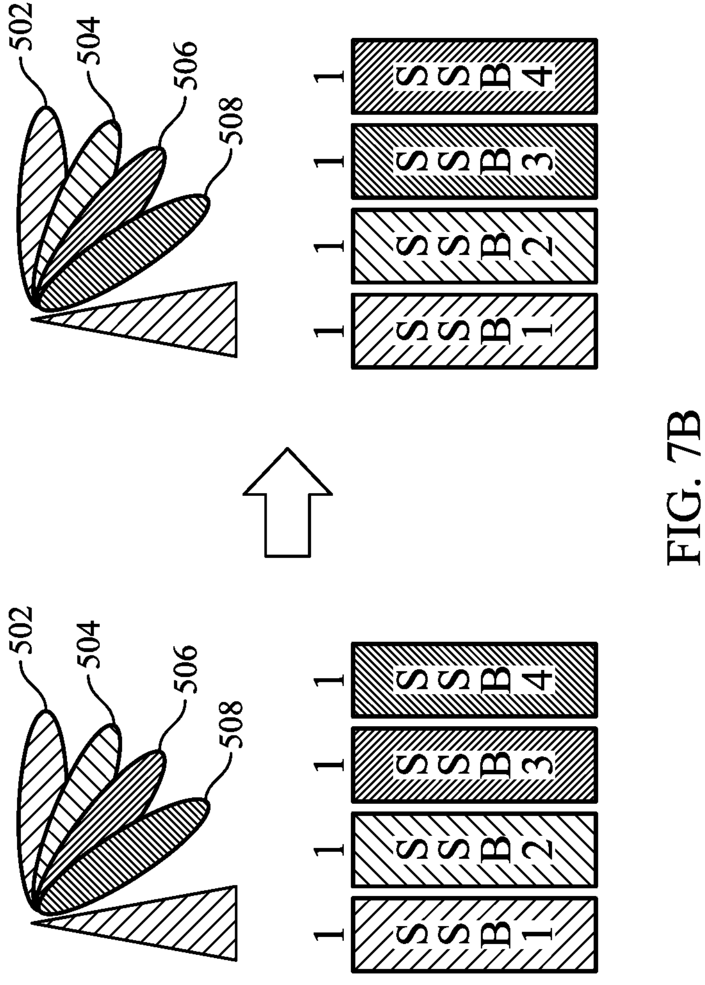

FIGS. 7A and 7B illustrate example SSB remapping scenarios. For example, as shown in FIG. 7A, SSB3 (e.g., assigned to beam 506) may be inactive and beam 508 may be used for SSB4. The SSB configuration may be updated so that SSB3 is assigned to beam 508 and SSB4 is deactivated. In this case, the UE may have to perform beam management (BM) for the new SSB index (e.g., may perform beam selection (P1), beam refinement for transmitter (P2), and beam refinement for recover (P3) operations), causing a long interruption. As shown in FIG. 7B, SSB3 may be reassigned from beam 506 to beam 508 and SSB4 may be reassigned from beam 508 to beam 506. In this case, the UE may have already trained an RX beam for beam 506 (e.g., previous assigned to SSB3), and thus, may use erroneous beams causing transmission (TX)/reception (RX) failures for some period of time.

Moreover, changing the TX beam of an SSB may impact the UE's measurements on either of the impacted SSBs (e.g., SSB3 and SSB4), such as layer 1 and layer 3 filtering on the measured SSBs, T/F tracking, beam failure detection (BFD)-reference signal (RS), or path loss (PL)-RS measurements. Changing the TX beam may also impact the UE's ML-based algorithm (e.g., used for training and/or inference for beam prediction) as well as the UE's search/measurement schedule. Although these impacts to UE operations are temporary, if the SSB remapping is frequent (e.g., occurring in the order of a few 100s of milliseconds or more often), the BS may notify the connected UE(s) of the SSB configuration change to assist the UE(s) operations.

Certain aspects provide assisting information to UEs (e.g., connected UEs) about the SSB remapping/rearrangement or associated physical beams. The assisting information may indicate the mapping from old SSB indices to new SSB indices (e.g., when SSBs are moved around between beams). In some aspects, a new rule may be included for UEs (e.g., or an indication may be sent to UEs) where the UE autonomously updates (e.g., at block 618 of FIG. 6) the QCL/TCI states accordingly based on the update (e.g., without performing a full RRC reconfiguration of the associated parameters). For example, if the beams for SSB3 and SSB4 are switched, the UE may set the QCL/TCI states for SSB4 based on the previous QCL/TCI states for SSB3 and vice versa.

In some aspects, to support QCL relation with a deactivated SSB, physical beams parameters may be indicated to the UE. For example, the BS may send a configuration update message to the UE, which may include an SSB index and an SSB coverage state which may be an integer value indicating the updated physical beam. For instance, a value of 0 may indicate that the SSB is inactive and other values may indicate that the SSB is activate and indicates the physical beam configuration of the SSB, such as the downlink transmit power, antenna tilt, antenna azimuth, digital tilt, digital azimuth and coverage shape. Thus, the coverage state may be used as a direct reference for QCL/TCI state definition.

Example Operations for SSB Modification

Figure 8:
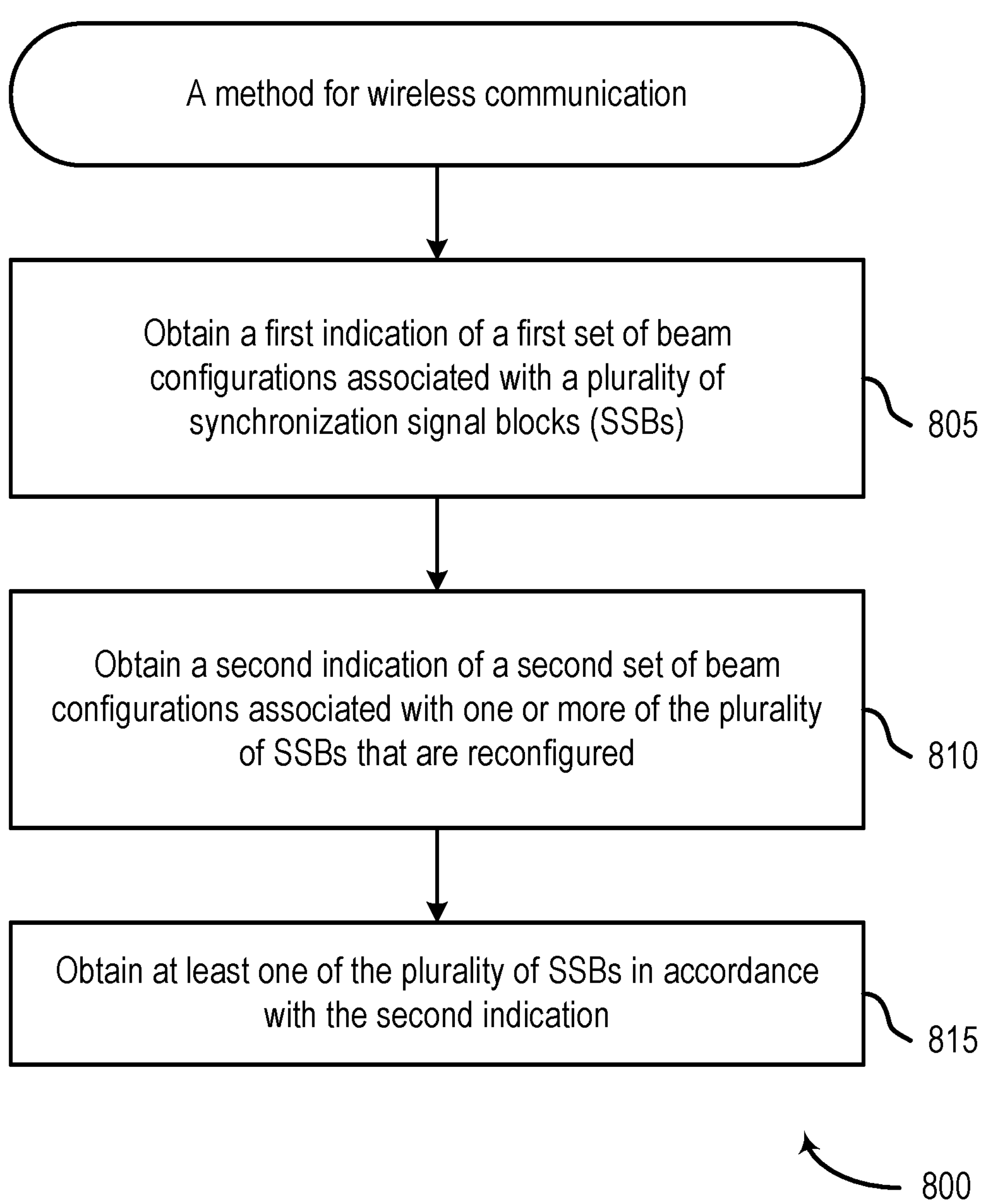
FIG. 8 depicts a method for wireless communications.

FIG. 8 shows an example of a method 800 of wireless communication at a UE, such as a UE 104 of FIGS. 1 and 3.

Method 800 begins at step 805 with obtaining a first indication of a first set of beam configurations associated with a plurality of synchronization signal blocks (SSBs). In some cases, the operations of this step refer to, or may be performed by, circuitry for obtaining and/or code for obtaining as described with reference to FIG. 10.

Method 800 then proceeds to step 810 with obtaining a second indication of a second set of beam configurations associated with one or more of the plurality of SSBs that are reconfigured. In some cases, the operations of this step refer to, or may be performed by, circuitry for obtaining and/or code for obtaining as described with reference to FIG. 10.

Method 800 then proceeds to step 815 with obtaining at least one of the plurality of SSBs in accordance with the second indication. In some cases, the operations of this step refer to, or may be performed by, circuitry for obtaining and/or code for obtaining as described with reference to FIG. 10.

In some aspects, the method 800 further includes outputting, after receiving the second indication, one or more random access channel (RACH) messages, wherein the one or more RACH messages are output for transmission based on the first set of beam configurations. In some cases, the operations of this step refer to, or may be performed by, circuitry for outputting and/or code for outputting as described with reference to FIG. 10.

In some aspects, the method 800 further includes performing SSB monitoring based on the second indication. In some cases, the operations of this step refer to, or may be performed by, circuitry for performing and/or code for performing as described with reference to FIG. 10.

In some aspects, the method 800 further includes performing rate matching based on the second indication. In some cases, the operations of this step refer to, or may be performed by, circuitry for performing and/or code for performing as described with reference to FIG. 10.

In some aspects, the method 800 further includes performing machine-learning (ML)-based beam prediction based on the second indication. In some cases, the operations of this step refer to, or may be performed by, circuitry for performing and/or code for performing as described with reference to FIG. 10.

In some aspects, the second indication is obtained via at least one of a radio resource control (RRC) message, media access control (MAC) control element (CE), or downlink control information (DCI).

In some aspects, the first set of beam configurations is obtained as part of a system information block (SIB).

In some aspects, the method 800 further includes outputting a request for the second indication, wherein the second indication is obtained after the request was outputted. In some cases, the operations of this step refer to, or may be performed by, circuitry for outputting and/or code for outputting as described with reference to FIG. 10.

In some aspects, the second indication is obtained as part of a physical downlink control channel (PDCCH).

In some aspects, the second indication is obtained as part of a physical downlink shared channel (PDSCH) scheduled by a PDCCH.

In some aspects, the second indication is obtained as part of a system information block (SIB).

In some aspects, the method 800 further includes obtaining a system information update indication, wherein the SIB is obtained after the system information update indication had been obtained. In some cases, the operations of this step refer to, or may be performed by, circuitry for obtaining and/or code for obtaining as described with reference to FIG. 10.

In some aspects, the second indication comprises an indication of physical beams associated with the one or more of the plurality of SSBs.

In some aspects, the second indication indicates that the one or more of the plurality of SSBs have been deactivated.

In some aspects, the second indication indicates that one or more physical beams associated with the one or more of the plurality of SSBs have been changed.

In some aspects, the second indication indicates that a beam associated with a first SSB of the plurality of SSBs has been changed to a beam previously associated with a second SSB of the plurality of SSBs.

In some aspects, the method 800 further includes updating a quasi-co-location (QCL) relationship associated with the first SSB based on a previous QCL relationship associated with the second SSB based on the second indication, wherein obtaining the at least one of the plurality of SSBs is based on the updated QCL relationship. In some cases, the operations of this step refer to, or may be performed by, circuitry for updating and/or code for updating as described with reference to FIG. 10.

Figure 10:
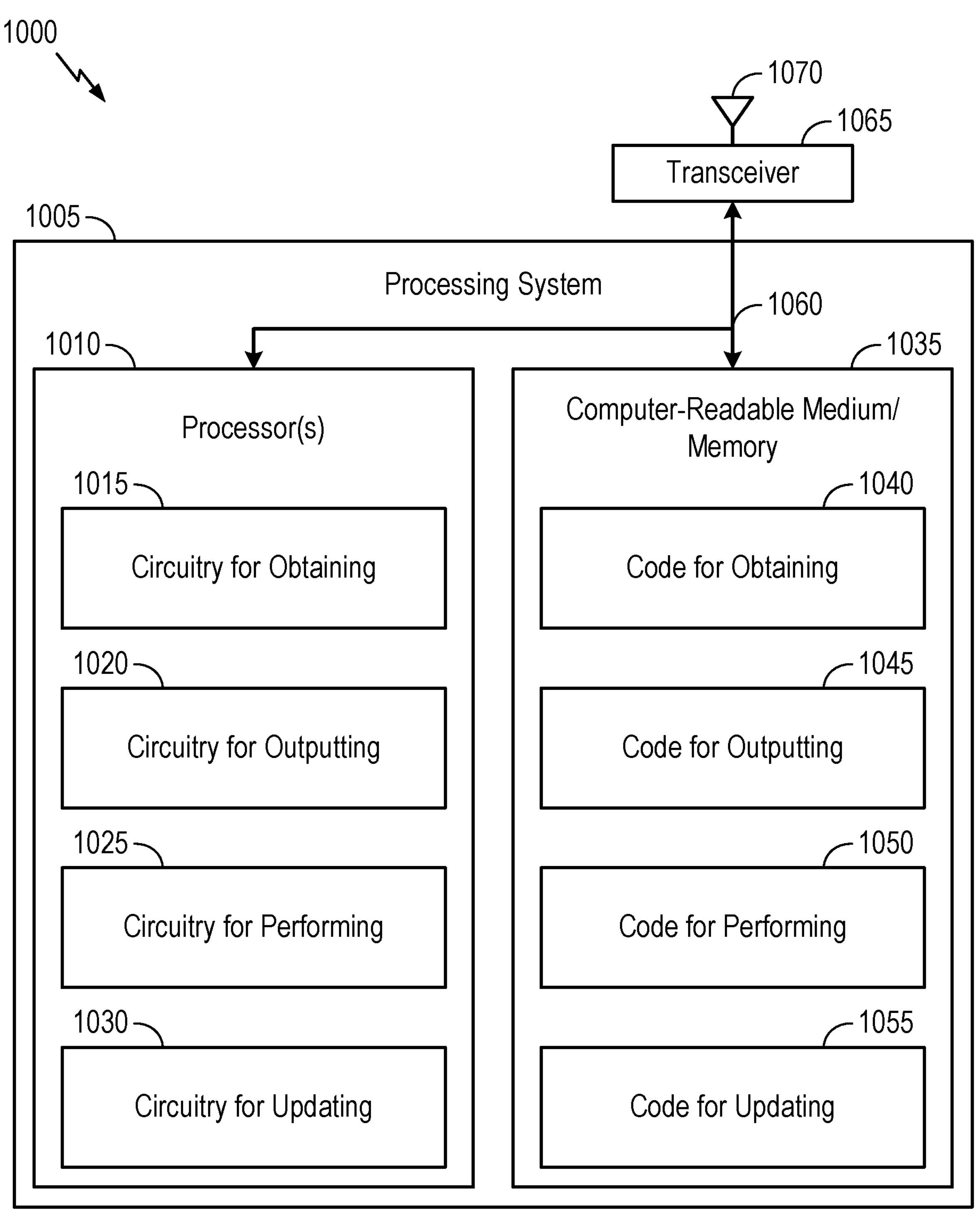
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Figure 9:
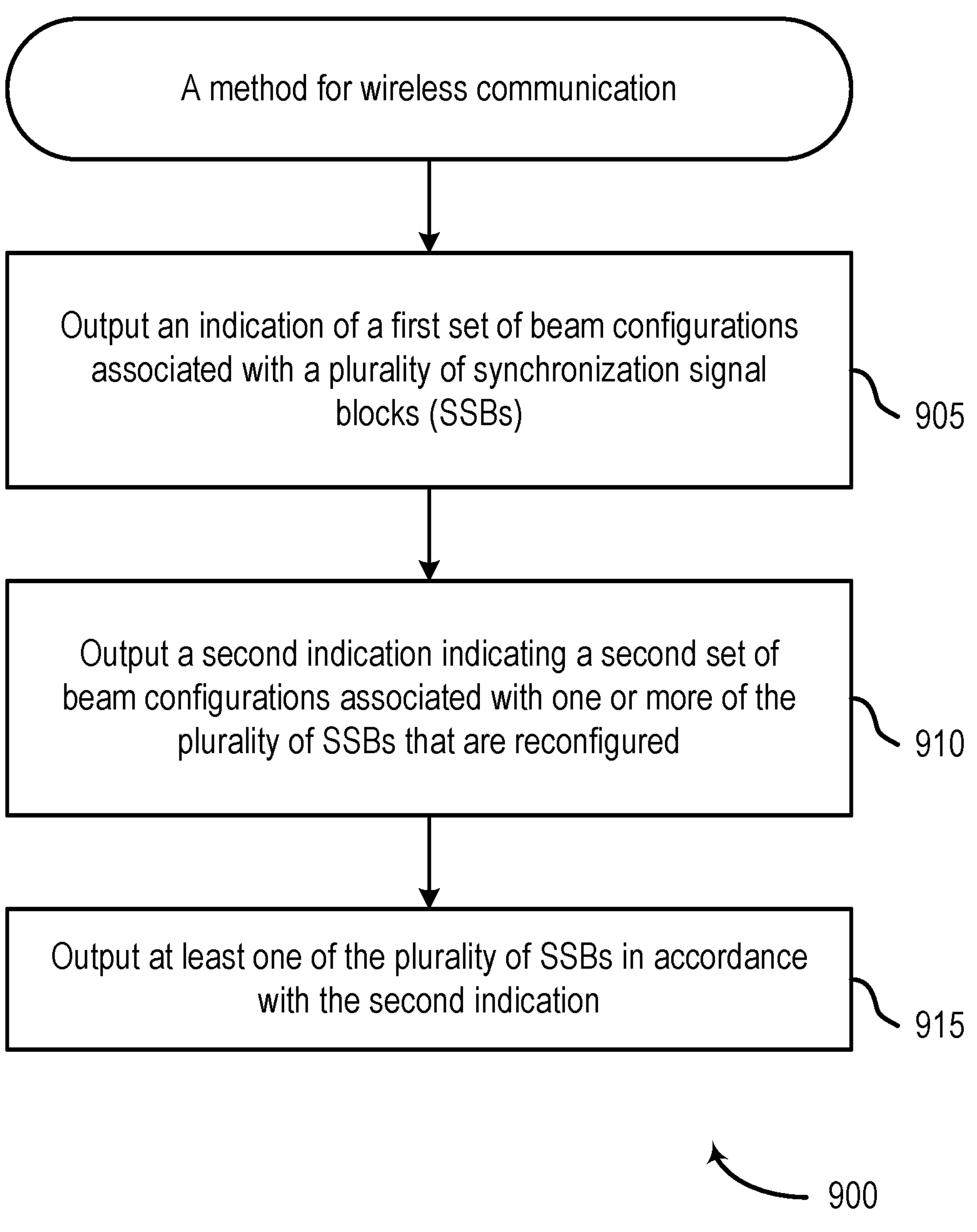
FIG. 9 depicts a method for wireless communications.

FIG. 9 shows an example of a method 900 of wireless communication at a UE, such as a BS 102 of FIGS. 1 and 3, or a disaggregated base station as discussed with respect to FIG. 2.

Method 900 begins at step 905 with outputting an indication of a first set of beam configurations associated with a plurality of synchronization signal blocks (SSBs). In some cases, the operations of this step refer to, or may be performed by, circuitry for outputting and/or code for outputting as described with reference to FIG. 11.

Method 900 then proceeds to step 910 with outputting a second indication indicating a second set of beam configurations associated with one or more of the plurality of SSBs that are reconfigured. In some cases, the operations of this step refer to, or may be performed by, circuitry for outputting and/or code for outputting as described with reference to FIG. 11.

Method 900 then proceeds to step 915 with outputting at least one of the plurality of SSBs in accordance with the second indication. In some cases, the operations of this step refer to, or may be performed by, circuitry for outputting and/or code for outputting as described with reference to FIG. 11.

In some aspects, the method 900 further includes obtaining one or more a random access channel (RACH) messages based on the first set of beam configurations after outputting the second indication indicating the second set of beam configuration. In some cases, the operations of this step refer to, or may be performed by, circuitry for obtaining and/or code for obtaining as described with reference to FIG. 11.

In some aspects, the second indication is used to assist a wireless node to perform at least one of SSB monitoring, rate matching, or machine-learning (ML)-based prediction.

In some aspects, the second indication is transmitted via at least one of a radio resource control (RRC) message, media access control (MAC) control element (CE), or downlink control information (DCI).

In some aspects, the first set of beam configurations are indicated as part of a system information block (SIB).

In some aspects, the second indication is outputted for transmission to at least one RRC-connected user equipment (UE).

In some aspects, the method 900 further includes obtaining a request for the second indication, wherein the second indication is transmitted in response to receiving the request. In some cases, the operations of this step refer to, or may be performed by, circuitry for obtaining and/or code for obtaining as described with reference to FIG. 11.

In some aspects, the second indication is transmitted as part of a physical downlink control channel (PDCCH).

In some aspects, the second indication is transmitted as part of a physical downlink shared channel (PDSCH) scheduled by a PDCCH.

In some aspects, the second indication is transmitted as part of a system information block (SIB).

In some aspects, the method 900 further includes outputting a system information update indication indicating to at least one wireless node to monitor for the SIB. In some cases, the operations of this step refer to, or may be performed by, circuitry for outputting and/or code for outputting as described with reference to FIG. 11.

In some aspects, the second indication comprises an indication of physical beams associated with the one or more of the plurality of SSBs.

In some aspects, the second indication indicates that the one or more of the plurality of SSBs have been deactivated.

In some aspects, the second indication indicates that one or more physical beams associated with the one or more of the plurality of SSBs have been changed.

In some aspects, the second indication indicates that a beam associated with a first SSB of the plurality of SSBs has been changed to a beam previously associated with a second SSB of the plurality of SSBs.

Figure 11:
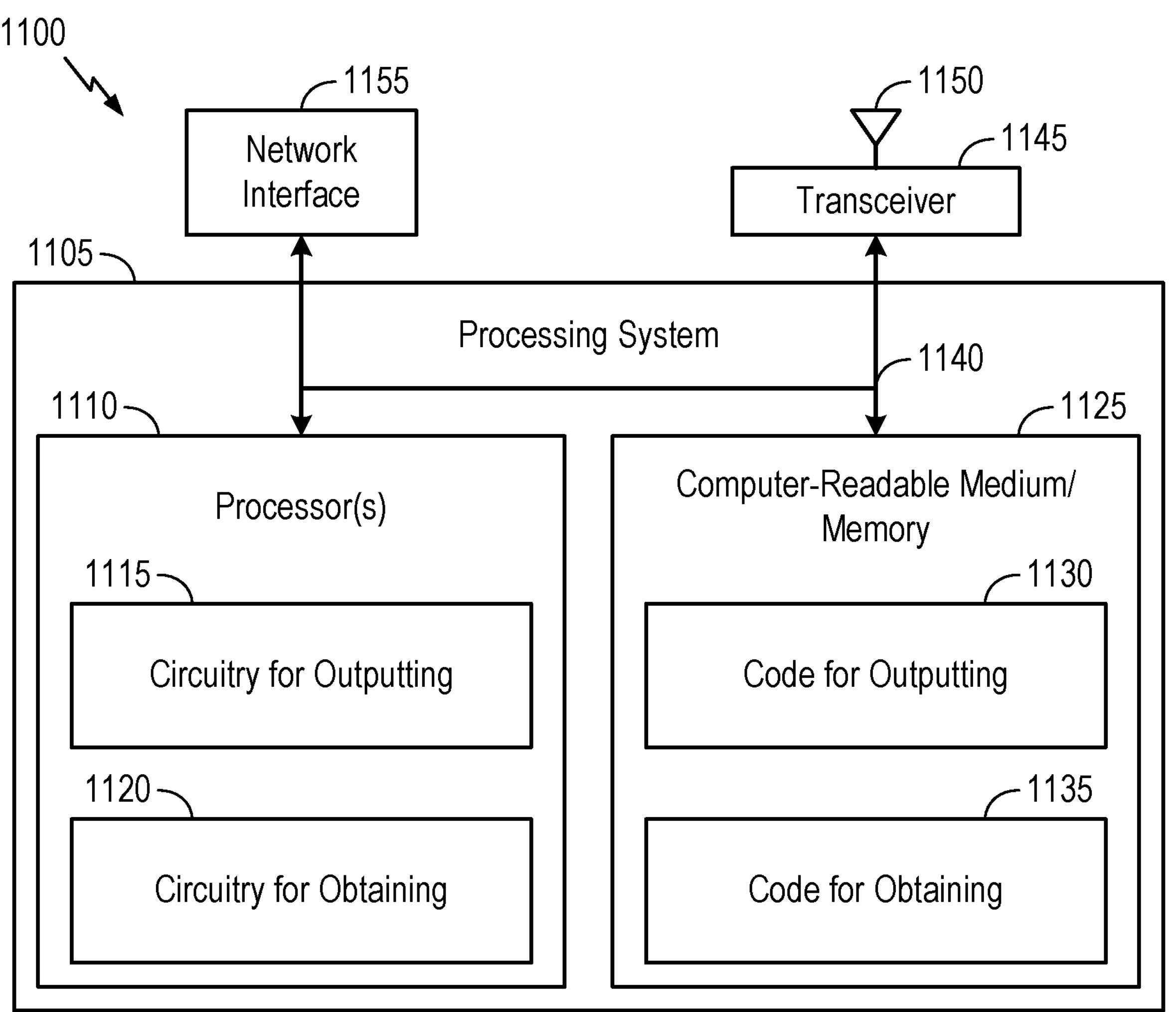
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Device(s)

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to the transceiver 1065 (e.g., a transmitter and/or a receiver). The transceiver 1065 is configured to transmit and receive signals for the communications device 1000 via the antenna 1070, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1035 via a bus 1060. In certain aspects, the computer-readable medium/memory 1035 is configured to store instructions (e.g., computer-executable code) that when executed by the one or more processors 1010, cause the one or more processors 1010 to perform the method 800 described with respect to FIG. 8, or any aspect related to it. Note that reference to a processor performing a function of communications device 1000 may include one or more processors 1010 performing that function of communications device 1000.

In the depicted example, computer-readable medium/memory 1035 stores code (e.g., executable instructions), such as code for obtaining 1040, code for outputting 1045, code for performing 1050, and code for updating 1055. Processing of the code for obtaining 1040, code for outputting 1045, code for performing 1050, and code for updating 1055 may cause the communications device 1000 to perform the method 800 described with respect to FIG. 8, or any aspect related to it.

The one or more processors 1010 include circuitry configured to implement (e.g., execute) the code stored in the computer-readable medium/memory 1035, including circuitry such as circuitry for obtaining 1015, circuitry for outputting 1020, circuitry for performing 1025, and circuitry for updating 1030. Processing with circuitry for obtaining 1015, circuitry for outputting 1020, circuitry for performing 1025, and circuitry for updating 1030 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1065 and the antenna 1070 of the communications device 1000 in FIG. 10. Means for receiving or obtaining may include transceivers 354 and/or antenna(s) 352 of the UE 104 illustrated in FIG. 3 and/or the transceiver 1065 and the antenna 1070 of the communications device 1000 in FIG. 10.

Means for performing may include one or more processors (such as a receive processor, a controller, and/or a transmit processor) of the UE 104 described with reference to FIG. 1 and/or the circuitry for performing 1025 of the communications device 1000. Means for updating may include one or more processors (such as a receive processor, a controller, and/or a transmit processor) of the UE 104 described with reference to FIG. 1 and/or the circuitry for updating 1030 of the communications device 1000.

In some cases, rather than actually transmitting, for example, signals and/or data, the communications device 1000 may have an interface to output signals and/or data for transmission (means for outputting). For example, a processor may output signals and/or data, via a bus interface, to a radio frequency (RF) front end of the communications device 1000 for transmission. In various aspects, the RF front end may include various components, including transmit and receive processors, transmit and receive MIMO processors, modulators, demodulators, and the like.

In some cases, rather than actually receiving signals and/or data, the communications device 1000 may have an interface to obtain the signals and/or data received from another device (means for obtaining). For example, a processor may obtain (or receive) the signals and/or data, via a bus interface, from an RF front end of the communications device 1000 for reception. In various aspects, the RF front end may include various components, including transmit and receive processors, transmit and receive MIMO processors, modulators, demodulators, and the like.

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1145 (e.g., a transmitter and/or a receiver) and/or a network interface 1155. The transceiver 1145 is configured to transmit and receive signals for the communications device 1100 via the antenna 1150, such as the various signals as described herein. The network interface 1155 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/memory 1125 stores code (e.g., executable instructions), such as code for outputting 1130 and code for obtaining 1135. Processing of the code for outputting 1130 and code for obtaining 1135 may cause the communications device 1100 to perform the method 900 described with respect to FIG. 9, or any aspect related to it.

The one or more processors 1110 include circuitry configured to implement (e.g., execute) the code stored in the computer-readable medium/memory 1125, including circuitry such as circuitry for outputting 1115 and circuitry for obtaining 1120. Processing with circuitry for outputting 1115 and circuitry for obtaining 1120 may cause the communications device 1100 to perform the method 900 described with respect to FIG. 9, or any aspect related to it.

Various components of the communications device 1100 may provide means for performing the method 900 described with respect to FIG. 9, or any aspect related to it. Means for transmitting, sending or outputting for transmission may include transceivers 332 and/or antenna(s) 334 of the BS 102 illustrated in FIG. 3 and/or the transceiver 1145 and the antenna 1150 of the communications device 1100 in FIG. 11. Means for receiving or obtaining may include transceivers 332 and/or antenna(s) 334 of the BS 102 illustrated in FIG. 3 and/or the transceiver 1145 and the antenna 1150 of the communications device 1100 in FIG. 11.

In some cases, rather than actually transmitting, for example, signals and/or data, the communications device 1100 may have an interface to output signals and/or data for transmission (means for outputting). For example, a processor may output signals and/or data, via a bus interface, to a radio frequency (RF) front end of the communications device 1100 for transmission. In various aspects, the RF front end may include various components, including transmit and receive processors, transmit and receive MIMO processors, modulators, demodulators, and the like.

In some cases, rather than actually receiving signals and/or data, the communications device 1100 may have an interface to obtain the signals and/or data received from another device (means for obtaining). For example, a processor may obtain (or receive) the signals and/or data, via a bus interface, from an RF front end of the wireless communications device 1100 for reception. In various aspects, the RF front end may include various components, including transmit and receive processors, transmit and receive MIMO processors, modulators, demodulators, and the like.

EXAMPLE ASPECTS

Implementation examples are described in the following numbered clauses:

Aspect 1: A method for wireless communication at a wireless node, comprising: obtaining a first indication of a first set of beam configurations associated with a plurality of synchronization signal blocks (SSBs); obtaining a second indication of a second set of beam configurations associated with one or more of the plurality of SSBs that are reconfigured; and obtaining at least one of the plurality of SSBs in accordance with the second indication.

Aspect 2: The method of Aspect 1, further comprising outputting, after receiving the second indication, one or more random access channel (RACH) messages, wherein the one or more RACH messages are output for transmission based on the first set of beam configurations.

Aspect 3: The method of Aspect 1 or 2, further comprising: performing SSB monitoring based on the second indication; performing rate matching based on the second indication; or performing machine-learning (ML)-based beam prediction based on the second indication.

Aspect 4: The method according to any of Aspects 1-3, wherein the second indication is obtained via at least one of a radio resource control (RRC) message, media access control (MAC) control element (CE), or downlink control information (DCI).

Aspect 5: The method according to any of Aspects 1-4, wherein the first set of beam configurations is obtained as part of a system information block (SIB).

Aspect 6: The method according to any of Aspects 1-5, wherein the method is performed by an RRC-connected user equipment (UE).

Aspect 7: The method according to any of Aspects 1-6, further comprising outputting a request for the second indication, wherein the second indication is obtained after the request was outputted.

Aspect 8: The method according to any of Aspects 1-7, wherein the second indication is obtained as part of a physical downlink control channel (PDCCH).

Aspect 9: The method according to any of Aspects 1-8, wherein the second indication is obtained as part of a physical downlink shared channel (PDSCH) scheduled by a PDCCH.

Aspect 10: The method according to any of Aspects 1-9, wherein the second indication is obtained as part of a system information block (SIB).

Aspect 11: The method of Aspect 10, further comprising obtaining a system information update indication, wherein the SIB is obtained after the system information update indication had been obtained.

Aspect 12: The method according to any of Aspects 1-11, wherein the second indication comprises an indication of physical beams associated with the one or more of the plurality of SSBs.

Aspect 13: The method according to any of Aspects 1-12, wherein the second indication indicates that the one or more of the plurality of SSBs have been deactivated.

Aspect 14: The method according to any of Aspects 1-13, wherein the second indication indicates that one or more physical beams associated with the one or more of the plurality of SSBs have been changed.

Aspect 15: The method according to any of Aspects 1-14, wherein the second indication indicates that a beam associated with a first SSB of the plurality of SSBs has been changed to a beam previously associated with a second SSB of the plurality of SSBs.

Aspect 16: The method of Aspect 15, further comprising updating a quasi-co-location (QCL) relationship associated with the first SSB based on a previous QCL relationship associated with the second SSB based on the second indication, wherein obtaining the at least one of the plurality of SSBs is based on the updated QCL relationship.

Aspect 17: A method for wireless communication, comprising: outputting a first indication of a first set of beam configurations associated with a plurality of synchronization signal blocks (SSBs); outputting a second indication indicating a second set of beam configurations associated with one or more of the plurality of SSBs that are reconfigured; and outputting at least one of the plurality of SSBs in accordance with the second indication.

Aspect 18: The method of Aspect 17, further comprising obtaining one or more a random access channel (RACH) messages based on the first set of beam configurations after outputting the second indication indicating the second set of beam configuration.

Aspect 19: The method of Aspect 17 or 18, wherein the second indication is used to assist a wireless node to perform at least one of SSB monitoring, rate matching, or machine-learning (ML)-based prediction.

Aspect 20: The method according to any of Aspects 17-19, wherein the second indication is transmitted via at least one of a radio resource control (RRC) message, media access control (MAC) control element (CE), or downlink control information (DCI).

Aspect 21: The method according to any of Aspects 17-20, wherein the first set of beam configurations are indicated as part of a system information block (SIB).

Aspect 22: The method according to any of Aspects 17-21, wherein the second indication is outputted for transmission to at least one RRC-connected user equipment (UE).

Aspect 23: The method according to any of Aspects 17-22, further comprising obtaining a request for the second indication, wherein the second indication is transmitted in response to receiving the request.

Aspect 24: The method according to any of Aspects 17-23, wherein the second indication is transmitted as part of a physical downlink control channel (PDCCH).

Aspect 25: The method according to any of Aspects 17-24, wherein the second indication is transmitted as part of a physical downlink shared channel (PDSCH) scheduled by a PDCCH.

Aspect 26: The method according to any of Aspects 17-25, wherein the second indication is transmitted as part of a system information block (SIB).

Aspect 27: The method of Aspect 26, further comprising outputting a system information update indication indicating to at least one wireless node to monitor for the SIB.

Aspect 28: The method according to any of Aspects 17-27, wherein the second indication comprises an indication of physical beams associated with the one or more of the plurality of SSBs.

Aspect 29: The method according to any of Aspects 17-28, wherein the second indication indicates that the one or more of the plurality of SSBs have been deactivated.

Aspect 30: The method according to any of Aspects 17-29, wherein the second indication indicates that one or more physical beams associated with the one or more of the plurality of SSBs have been changed.

Aspect 31: The method according to any of Aspects 17-30, wherein the second indication indicates that a beam associated with a first SSB of the plurality of SSBs has been changed to a beam previously associated with a second SSB of the plurality of SSBs.

Aspect 32: An apparatus, comprising: a memory comprising executable instructions; and a processor configured to execute the executable instructions and cause the apparatus to perform a method in accordance with any one of Aspects 1-31.

Aspect 33: An apparatus, comprising means for performing a method in accordance with any one of Aspects 1-31.

Aspect 34: A non-transitory computer-readable medium comprising executable instructions that, when executed by a processor of an apparatus, cause the apparatus to perform a method in accordance with any one of Aspects 1-31.

Aspect 35: A computer program product embodied on a computer-readable storage medium comprising code for performing a method in accordance with any one of Aspects 1-31.

Aspect 36: A user equipment (UE), comprising: at least one transceiver; a memory comprising executable instructions; and a processor configured to execute the executable instructions and cause the apparatus to perform a method in accordance with any one of Aspects 1-16, wherein the at least one transceiver is configured to receive the first and second indications.

Aspect 37: A network entity, comprising: at least one transceiver; a memory comprising executable instructions; and a processor configured to execute the executable instructions and cause the apparatus to perform a method in accordance with any one of Aspects 17-31, wherein the at least one transceiver is configured to transmit the first and second indications.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
- at least one transceiver;
- at least one processor;
- memory coupled with the at least one processor; and
- instructions stored in the memory and executable by the at least one processor to cause the apparatus to:
  - receive, via the at least one transceiver, a first indication of a first set of beam configurations associated with a plurality of synchronization signal blocks (SSBs);
  - receive, via the at least one transceiver, a second indication of a second set of beam configurations associated with one or more of the plurality of SSBs that are reconfigured; and
  - receive, via the at least one transceiver, at least one of the plurality of SSBs in accordance with the second indication.

2. The apparatus of claim 1, wherein the at least one processor further causes the apparatus to transmit via the at least one transceiver, after receiving the second indication, one or more random access channel (RACH) messages, wherein the one or more RACH messages are transmitted based on the first set of beam configurations.

3. The apparatus of claim 1, wherein the at least one processor further causes the apparatus to at least one of:
- perform SSB monitoring based on the second indication;
- perform rate matching based on the second indication; or
- perform machine-learning (ML)-based beam prediction based on the second indication.

4. The apparatus of claim 1, wherein the second indication is received via at least one of a radio resource control (RRC) message, media access control (MAC) control element (CE), or downlink control information (DCI).

5. The apparatus of claim 1, wherein the first set of beam configurations is received as part of a system information block (SIB).

6. The apparatus of claim 1, wherein the apparatus is configured to operate as an RRC-connected user equipment (UE).

7. The apparatus of claim 1, wherein the at least one processor further causes the apparatus to transmit, via the at least one transceiver, a request for the second indication, wherein the second indication is received after the request was transmitted.

8. The apparatus of claim 1, wherein the second indication is received as part of a physical downlink control channel (PDCCH).

9. The apparatus of claim 1, wherein the second indication is received as part of a physical downlink shared channel (PDSCH) scheduled by a PDCCH.

10. The apparatus of claim 1, wherein the second indication is received as part of a system information block (SIB).

11. The apparatus of claim 10, wherein the at least one processor further cause the apparatus to receive, via the at least one transceiver, a system information update indication, wherein the SIB is received after the system information update indication had been received.

12. The apparatus of claim 1, wherein the second indication comprises an indication of physical beams associated with the one or more of the plurality of SSBs.

13. The apparatus of claim 1, wherein the second indication indicates that the one or more of the plurality of SSBs have been deactivated.

14. The apparatus of claim 1, wherein the second indication indicates that one or more physical beams associated with the one or more of the plurality of SSBs have been changed.

15. The apparatus of claim 1, wherein the second indication indicates that a beam associated with a first SSB of the plurality of SSBs has been changed to a beam previously associated with a second SSB of the plurality of SSBs.

16. The apparatus of claim 15, wherein the at least one processor further causes the apparatus to update a quasi co-location (QCL) relationship associated with the first SSB based on a previous QCL relationship associated with the second SSB based on the second indication, wherein receiving the at least one of the plurality of SSBs is based on the updated QCL relationship.

17. The apparatus of claim 1, wherein the apparatus is configured to operate as a user equipment.

18. An apparatus for wireless communication, comprising:
- at least one transceiver;
- at least one processor;
- memory coupled with the at least one processor; and
- instructions stored in the memory and executable by the at least one processor to cause the apparatus to:

transmit, via the at least one transceiver, a first indication of a first set of beam configurations associated with a plurality of synchronization signal blocks (SSBs);

transmit, via the at least one transceiver, a second indication indicating a second set of beam configurations associated with one or more of the plurality of SSBs that are reconfigured; and transmit, via the at least one transceiver, at least one of the plurality of SSBs in accordance with the second indication.

19. The apparatus of claim 18, wherein the at least one processor further causes the apparatus to receive, via the at least one transceiver, one or more a random access channel (RACH) messages based on the first set of beam configurations after transmitting the second indication indicating the second set of beam configurations.

20. The apparatus of claim 18, wherein the second indication is used to assist a wireless node to perform at least one of SSB monitoring, rate matching, or machine-learning (ML)-based prediction.

21. The apparatus of claim 18, wherein the second indication is transmitted via at least one of a radio resource control (RRC) message, media access control (MAC) control element (CE), or downlink control information (DCI).

22. The apparatus of claim 18, wherein the first set of beam configurations are indicated as part of a system information block (SIB).

23. The apparatus of claim 18, wherein the second indication is transmitted to at least one RRC-connected user equipment (UE).

24. The apparatus of claim 18, wherein the at least one processor further causes the apparatus to receive, via the at least one transceiver, a request for the second indication, wherein the second indication is transmitted in response to receiving the request.

25. The apparatus of claim 18, wherein the second indication is transmitted as part of a physical downlink control channel (PDCCH).

26. The apparatus of claim 18, wherein the second indication comprises an indication of physical beams associated with the one or more of the plurality of SSBs.

27. The apparatus of claim 18, wherein the second indication indicates that one or more physical beams associated with the one or more of the plurality of SSBs have been changed.

28. The apparatus of claim 18, wherein the second indication indicates that a beam associated with a first SSB of the plurality of SSBs has been changed to a beam previously associated with a second SSB of the plurality of SSBs.

29. The apparatus of claim 18, wherein the apparatus is configured as a network entity.

30. A method for wireless communication by a wireless node, comprising:

receiving a first indication of a first set of beam configurations associated with a plurality of synchronization signal blocks (SSBs);

receiving a second indication of a second set of beam configurations associated with one or more of the plurality of SSBs that are reconfigured; and receiving at least one of the plurality of SSBs in accordance with the second indication.

* * * * *